United States Patent

Yumoto

[15] 3,659,367

[45] May 2, 1972

[54] FEATURE VARIABLE PICTURE AND BOOK

[72] Inventor: Hirokazu Yumoto, Tokyo, Japan

[73] Assignee: Sumida Shiko Co., Ltd., Tokyo, Japan

[22] Filed: June 15, 1970

[21] Appl. No.: 46,161

[52] U.S. Cl. ....................40/65, 35/20
[51] Int. Cl. ....................G09f 11/30
[58] Field of Search ....................40/65

[56] References Cited

UNITED STATES PATENTS 3,403,465 10/1968 Lane ....................40/65
3,421,240 1/1969 Bardi ....................40/65

*Primary Examiner*—Robert W. Michell
*Assistant Examiner*—Richard Carter
*Attorney*—Ernest A. Greenside

[57] ABSTRACT

A feature variable picture embodying a stationary picture assembly and a sliding picture assembly of different feature from the stationary picture assembly which are slideably incorporated one another to present two different features of picture alternately.

4 Claims, 7 Drawing Figures

INVENTOR
HIROKAZU YUMOTO

INVENTOR
HIROKAZU YUMOTO

FEATURE VARIABLE PICTURE AND BOOK

BACKGROUND OF THE INVENTION

A typical changing picture frequently encountered in present day is a perspective view type picture in which two different features are drawn in a single crude surface so that viewers may enjoy two different features of picture by perspective looking of the object. However, according to the changing picture of this type, an angle of the object or a viewing position of viewer must be changed to look the different features of picture and viewer cannot always enjoy the changing picture as desired under poor light enviroments. Moreover, as is frequently used for the advertisement pillar there is another manner to change the picture by turning a number of slit plates showing features. However, the device of extremely large size cannot be used for the purpose other than the advertisement tower.

SUMMARY OF THE INVENTION

With the foregoing in mind, it is a general object of the invention to provide a feature variable picture by which the pictures, photographs, designs and letters of the different or double features may be enjoyed in a single plane with a simple manipulation under the ordinary standpoint.

A principal object of the invention is to provide a feature variable picture in which a stationary picture assembly and a sliding picture assembly of different feature from the stationary picture assembly are slidably incorporated with each other to show the two different features of picture alternately. In accordance with the present invention, two sheets of picture of the same feature are provided respectively with a number of channel cuts at a given space to form corresponding numbers of individual feature segments which are superimposed one another with a predetermined offset to retain the picture in the original feature and fixed to a cover plate thereby to form a first or stationary picture assembly, while a certain picture of tne different feature from the said second or stationary picture assembly is divided into a number of feature frames or scenes each one of which being sticked stepwisely onto a sliding plate to form a desired picture and the opened ends of the frames are slidably inserted between the superimposed feature segments of the stationary picture assembly so that the pictures of different features appear alternately by a simple manipulation of the sliding plate.

A further object of the present invention is to provide a changing picture book containing a number of features variable pictures.

These and other objects of the invention will become apparent as the description proceeds in particular reference to the accompanying drawings, in which:

DETAILED DESCRIPTION OF THE INVENTION

Figure 1:
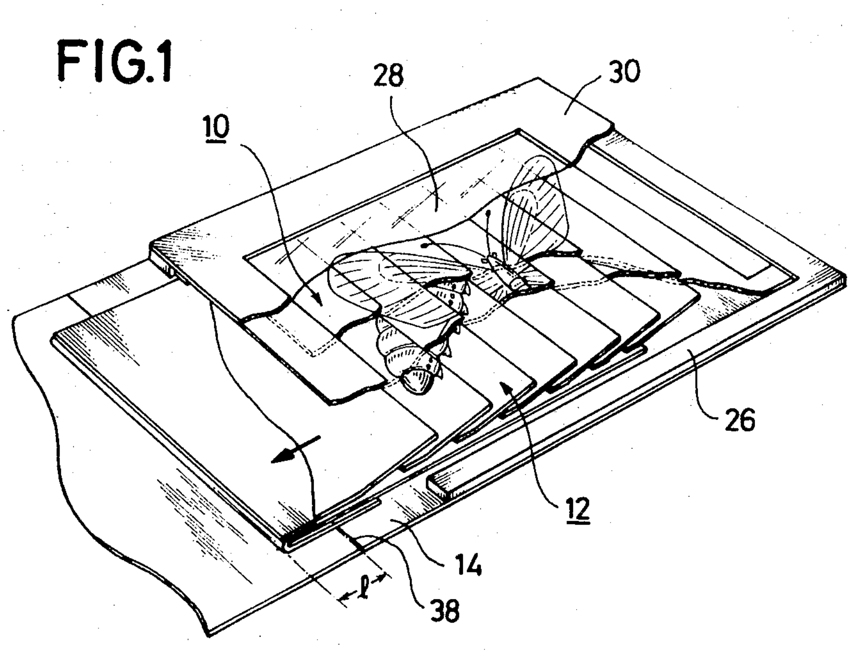
FIG. 1 is a perspective view of the feature variable picture in accordance with the present invention a portion of which is broken away to show the construction of picture elements.

Referring now in more detail to the drawings, wherein like parts are indicated by like reference numerals, and initially to FIG. 1, there is illustrated therein in perspective view a feature variable picture comprised of a first or stationary picture assembly 10, a sliding picture assembly 12 of the different feature from the stationary picture assembly 10 and a cover plate 14.

Figures 2, 3:
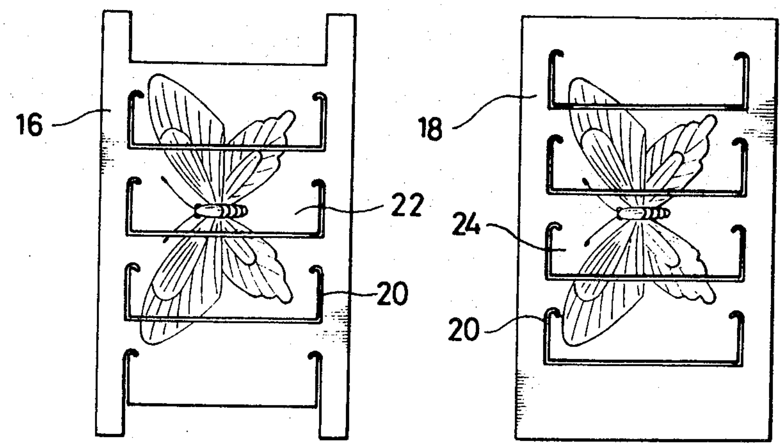
FIG. 2 is a plane view of an upper member of the stationary picture assembly.
FIG. 3 is a plane view similar to FIG. 2 showing an under member of the stationary picture assembly.

As best shown in FIGS. 2 and 3, the stationary picture assembly 10 comprises an upper picture member 16 and an under picture plate 18 and both upper and under picture plates are provided with a number of channel cuts 20 to form corresponding numbers of feature segments 22 and 24.

Figure 4:
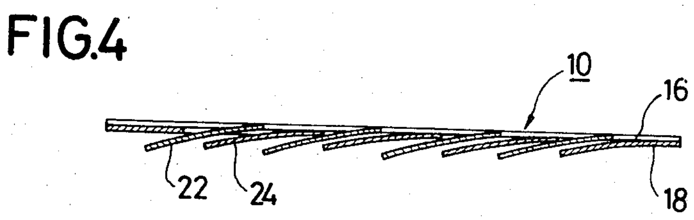
FIG. 4 is a lateral view in sectioned of an assembly of the upper and lower members as shown in FIGS. 2 and 3.

The upper and under picture plates 16 and 18 are assembled by superimposing individual substantially U-shaped segments 22 and 24 one another with some offset as shown in FIG. 4 in sectioned view so that the given picture is retained in the original feature.

The thusly formed first picture assembly is fixed at its circumference to a cover plate 14 through an interlayer of suitable thickness 26 which facilitates a smooth sliding operation of the sliding picture assembly 12.

Moreover, the stationary picture assembly 10 is preferably covered by a transparent sheet 28 such as cellophane, vinyl and the like with a surrounding hard frame such as card board as designated at 30 to enhance an appearance of the changing picture.

Figure 5:
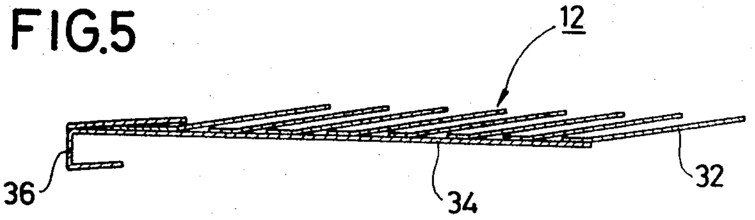
FIG. 5 is a lateral view in sectioned of the sliding picture assembly.
Figure 7:
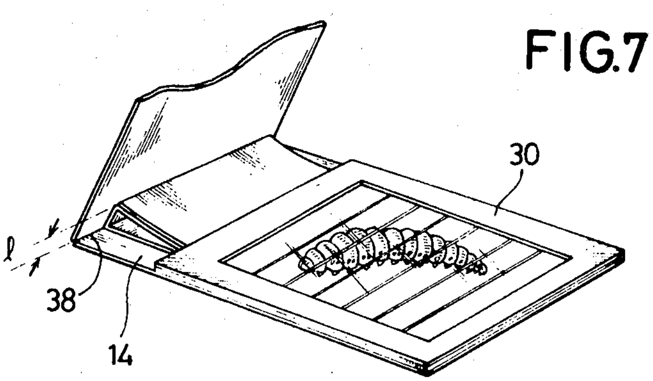
FIG. 7 is a perspective view of the feature variable picture in accordance with the present invention showing the state that the feature of the sliding picture assembly is exposed.

Referring to FIG. 5 in sectioned view, the sliding picture assembly 12 comprises a number of cut frames or scenes 32 which at their ends are sticked to the sliding plate 34 in superimposed relation with some offset to form a complete picture of desired feature. One end portion of the sliding plate 34 is bent outwardly to form a channel corner 36 which at its one face is sticked across the bending line 38 to the cover plate 14 as best shown in FIGS. 1 and 7.

Figure 6:
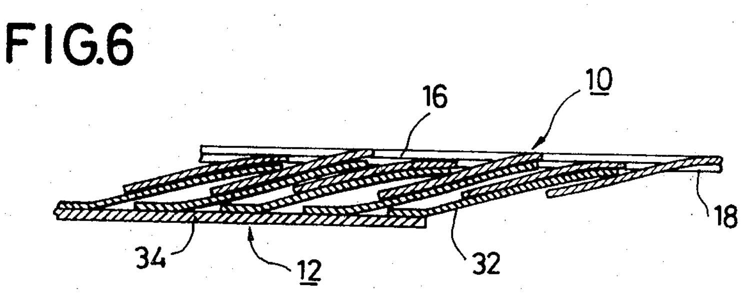
FIG. 6 is a lateral view in partially sectioned of an incorporation of the stationary picture assembly and the sliding picture assembly.

The individual frame or scene 32 is slidably interposed between the superimposed feature segments 22 and 24 as best shown in FIG. 6 in partially sectioned view so that the feature of the stationary picture assembly and that of the sliding picture assembly are displayed alternately by a simple manipulation of the sliding plate 34.

In the state as best shown in FIG. 1, the cover plate 14 is completely opened in flat and as a result the sliding plate 34 is pulled toward the direction shown by an arrow in a distance of "*l*" so that the individual cut frame 32 is completely suppressed between the overlapping feature segments 22 and 24 while exposing the complete feature of the stationary picture. On the other hand, in the state as best shown in FIG. 7, the cover plate 14 is half closed and as a result the sliding plate 34 is moved to the direction opposite to that of the opened state in a distance of "*l*" so that the individual cut frames 32 are extruded from the overlapping feature segments 22 and 24 while screening the feature of the stationary picture as a complete feature of the sliding picture appears.

A number of the feature variable picture according to the invention may be bound to make a picture changing book especially for a child guidance.

Moreover, it may be available to various utilizations including educational, artistic and playing purposes.

It will be apparent that obvious variations can be made from the above description without, however, departing from the scope of the invention.

I claim:

1. A display device comprising a fixed display assembly constituted of first and second longitudinally extending plates, each plate being unitary and formed with longitudinally spaced substantially like-shaped slits defining substantially like-shaped tongued segments, displaced out of the plane of said plates, said first and second plates having a similar picture display thereon forming a first display, said first and second plates being interlocked in overlying relation with individual segments of the first plate superposing predetermined corresponding segments of the second plate, and a movable display assembly constituted of a plate carrying a second display, said latter plate having a plurality of transverse frame sections extending outwardly therefrom, said transverse sections being in a longitudinal array and sized and shaped to interleave said segments of said first and second plates of said fixed display assembly, and manually operated means for moving said movable display assembly relative to said fixed display assembly whereby said movable display assembly may be displaced to overlie the segments of said first assembly so that the display thereon may be viewed.

2. A device according to claim 1 wherein said first and second plates are of substantially the same dimension with the slits of said first plate, prior to assembly with said second plate, being longitudinally offset with respect to the slits of the second plate, said first and second plates carrying identical fixed displays which overlie one another in said fixed display assembly.

3. A device according to claim 2, wherein said slits in each of said first and second plates are substantially U-shaped thereby forming substantially U-shaped cut-out segments, the U-shaped segments of the first plate passing through openings formed by corresponding slits in the second plate to provide said superposed segments.

4. A device according to claim 1, wherein said overlying frame sections of the movable display assembly are connected at one end thereof to a cover plate having a fixed section and a section movable relative thereto between first and second positions, said fixed display assembly being carried by the fixed section of the cover plate, said movable display assembly being adhered to the movable section for movement thereby when manually moved between first and second positions.

* * * * *